(12) United States Patent
Tani et al.

(10) Patent No.: US 6,875,537 B2
(45) Date of Patent: Apr. 5, 2005

(54) MEMBRANE ELECTRODE ASSEMBLY FOR POLYMER ELECTROLYTE FUEL CELL

(75) Inventors: Masaki Tani, Wako (JP); Kaoru Fukuda, Wako (JP); Chikara Iwasawa, Wako (JP); Shigeru Inai, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/314,348

(22) Filed: Dec. 9, 2002

(65) Prior Publication Data

US 2004/0219419 A1 Nov. 4, 2004

(30) Foreign Application Priority Data

Dec. 12, 2001 (JP) ........................ 2001-379163

(51) Int. Cl.[7] .................. H01M 4/86; H01M 4/90
(52) U.S. Cl. ..................... 429/40; 429/42; 429/44; 429/33; 429/30; 429/12
(58) Field of Search ................ 429/40, 42, 44, 429/33, 30, 12

(56) References Cited

U.S. PATENT DOCUMENTS

| | | | | |
|---|---|---|---|---|
| 5,856,036 A | * | 1/1999 | Smotkin et al. | 429/40 |
| 6,040,077 A | * | 3/2000 | Debe et al. | 429/40 |
| 6,326,098 B1 | * | 12/2001 | Itoh et al. | 429/40 |

FOREIGN PATENT DOCUMENTS

| | | |
|---|---|---|
| JP | 11-250918 | 9/1999 |
| JP | 2000-12043 | 1/2000 |

* cited by examiner

Primary Examiner—Gregg Cantemo
Assistant Examiner—Angela J. Martin
(74) Attorney, Agent, or Firm—Arent Fox PLLC

(57) ABSTRACT

A membrane electrode assembly for polymer electrolyte fuel cells comprises a cathode electrode, an anode electrode, and a polymer electrolyte membrane placed between these electrodes, and a catalyst material of Pt—Ru alloy is contained in the anode and the crystal of Pt—Ru alloy is mainly of a face-centered cubic structure.

4 Claims, 5 Drawing Sheets

MEMBRANE ELECTRODE ASSEMBLY FOR POLYMER ELECTROLYTE FUEL CELL

BACKGROUND OF THE INVENTION

1. Technical Field

The present invention relates to a membrane electrode assembly for polymer electrolyte fuel cells, and in particular, relates to a technology which can restrain leaching of a catalyst material when there is a shortage of fuel gas, such as hydrogen, in the anode side.

2. Background Art

A polymer electrolyte fuel cell (hereinafter simply referred to as "fuel cell") is composed by laminating separators at both sides of a flat electrode structure. The electrode structure is a stacked element having a polymer electrolyte membrane held between a positive side electrode catalyst layer and a negative side electrode catalyst layer, with a gas diffusion layer laminated outside of each electrode catalytic layer. In such a fuel cell, for example, when hydrogen gas is supplied in a gas passage of the separator disposed at the negative electrode side, and an oxidizing gas is supplied in a gas passage of the separator disposed at the positive electrode side, an electrochemical reaction occurs, generating an electric current. During operation of the fuel cell, the gas diffusion layer transmits the electrons generated by electrochemical reaction between the electrode catalytic layer and the separator, and diffuses the fuel gas and the oxidizing gas at the same time. The negative side electrode catalytic layer induces a chemical reaction in the fuel gas to generate protons ($H^+$) and electrons, and the positive side electrode catalytic layer generates water from oxygen, protons and electrons, and the electrolyte membrane transmits protons by ionic conduction. As a result, electric power is provided from the positive and negative electrode catalytic layers.

As an electrode catalytic layer, a mixture of carbon particles carrying a catalyst material such as a rare metal and an electrolyte consisting of an ion conducting polymer, is well known. Pt alone or Pt with other metals is known as the catalyst material. In particular, a Pt—Ru alloy is used in a fuel electrode to prevent Pt from being poisoned by impurities such as carbon monoxide included in hydrogen gas which is used as a fuel gas.

A fuel cell is used in stacks in which dozens to hundreds of membrane electrode assemblies are laminated via separators. In a situation in which such a fuel cell is operated, it is known that there may be a temporary shortage of fuel gas, thereby generating reverse voltage in the entirety or a part of the anode due to the delay of fuel gas supply when the output changes extremely, or water-discharging ability of the membrane electrode assembly is reduced. If the reverse voltage is generated, electrolysis of water is promoted, and furthermore, it is known that carbon particles are corroded. This is considered to occur as following reactions.

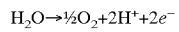

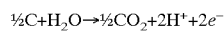

WO01/15247, WO01/15249, WO01/15254, and WO01/15255, methods to prevent carbon particles from being corroded, are disclosed.

However, the deterioration of generation efficiency cannot be prevented sufficiently by these methods.

SUMMARY OF THE INVENTION

Therefore, an object of the present invention is to provide a polymer electrolyte fuel cell and a membrane electrode assembly for the polymer electrolyte fuel cell which can exhibit almost the same generation efficiency as that before occurrence of reverse voltage, even after the occurrence of the reverse voltage.

The inventors performed further research about the deterioration of generation efficiency after occurrence of reverse voltage, and it became clear that a specific Ru element in Pt—Ru alloy which composes the catalyst material leaches out and migrates to the cathode side and the diffusion layer of the anode side through the polymer electrolyte membrane.

The present invention provides a membrane electrode assembly for polymer electrolyte fuel cells which comprise a cathode electrode, an anode electrode, and the polymer electrolyte membrane placed between these electrodes of the present invention, and Pt—Ru alloy is contained in the anode and the crystal of the Pt—Ru alloy is mainly of a face-centered cubic structure.

Pt—Ru alloy which is usually used as a catalyst material is composed of a face-centered cubic structure containing a large amount of Pt and a hexagonal closest packed structure containing a large amount of Ru. In particular, to improve carbon monoxide poisoning resistance, the amount of contained Ru is greater than that of Pt. For example, an alloy which contains 1.5 times as much Ru as the content of Pt is used. In this case, a duplex structure consisting of a face-centered cubic structure and a hexagonal closest packed structure is formed, because alloying is performed by heat treatment at from 600 to 900° C.

However, by further research by the inventors, it was confirmed that leaching of Ru occurs in the Ru-rich hexagonal closest packed structure accompanied with the occurring of reverse voltage. Therefore, deterioration of generating efficiency can be restrained by using a Pt—Ru alloy which is mainly composed of Pt-rich face-centered cubic structure.

Although it is ideal that the entirety of the Pt—Ru alloy be of a face-centered cubic structure, 0 to 20% of hexagonal closest packed structure can be contained depending on producing conditions. That is to say, in the present invention, it is desirable that the ratio of the face-centered cubic structure of the Pt—Ru alloy be more than 80%, and this is indicated by use of the word "mainly". This ratio is measured from the intensity ratio of both of the crystal phases in X-ray diffraction.

It is desirable that the Pt—Ru alloy be obtained by quenching or furnace cooling from a temperature of 1000 to 2000° C. This is because the single phase of the face-centered cubic structure is easily generated even if the added amount of Ru is increased to improve carbon monoxide poisoning resistance.

It is desirable that the atomic ratio of Pt and Ru be in a range of from 28:72 to 45:55. Although it is desirable to add as much Ru as possible from the viewpoint of carbon monoxide poisoning resistance, preparing of the single phase of face-centered cubic structure becomes impossible if the added amount of Ru exceeds the ratio mentioned above. This fact can be confirmed from the phase equilibrium diagram of Pt/Ru. In addition, if the added amount of Ru is less than the ratio mentioned above, effects of the carbon monoxide poisoning resistance diminishes.

The effect of the present invention is explained by referring to FIG. 1 to 8. FIG. 1 is a graph showing the transitions of the terminal voltage of a fuel cell having a system which generates hydrogen gas from gasoline, in the case in which hydrogen gas is supplied at 90% of utilization ratio. "Utilization ratio" means a ratio of required hydrogen gas to hydrogen gas supplied to the anode. Generally speaking, the utilization ratio is less than 50% in a condition of stable supply in a fuel cell. As shown in FIG. 1, also in this case, reverse voltage is generated under hydrogen-deficient conditions. The terminal voltage is stable around −0.09 V. Next, FIG. 2 is a graph showing the transitions of the terminal voltage wherein after supplying hydrogen gas to the anode side at a utilization ratio of 50%, the utilization ratio is increased to 100%. As shown in FIG. 2, the terminal voltage is decreased to −0.5 V as soon as the utilization ratio is increased, and the voltage is unstable for about 50 minutes. After that, the terminal voltage is further diminished until about −1.5 V. It is obvious that reverse voltage occurs by generating electricity under the conditions of hydrogen deficiency, and the extent of the reverse voltage is increased as the utilization ratio of hydrogen gas is increased.

Next, FIG. 3 is a graph showing the transition of the terminal voltage wherein hydrogen gas was stably supplied at 50% of the utilization ratio before and after hydrogen gas was supplied at 90% of the utilization ratio to generate reverse voltage. Similarly, FIG. 4 is a graph showing the transition of the terminal voltage wherein hydrogen gas was stably supplied at 50% of the utilization ratio before and after hydrogen gas was supplied at 100% of the utilization ratio to generate reverse voltage. As shown in FIG. 3 and 4, in the case of reverse voltage at 90% of the utilization ratio, little deterioration of the fuel cell was observed. However, in the case of reverse voltage at 100% of the utilization ratio, the fuel cell was greatly deteriorated. It is confirmed that the deterioration of a fuel cell is severe at voltages above the specific value. Therefore, the causal relationship of the reverse voltage and the deterioration of the fuel cell was researched.

A fuel cell in which reverse voltage was generated at 90% of the utilized fuel gas ratio and a fuel cell in which reverse voltage was generated at 100% of the utilized fuel gas ratio were prepared, and FIG. 5 is a graph showing the transition of the terminal voltages of these fuel cells in which a mixed gas in which CO gas was added to hydrogen was supplied stably. As is shown in FIG. 5, in the fuel cell in which reverse voltage was generated at 100% of the utilized fuel gas ratio, the terminal voltage was greatly lowered if fuel gas containing 100 ppm of CO was supplied, and then, the fuel cell could not function any longer if fuel gas containing 200 ppm of CO was supplied. From this result, it is confirmed that the reverse voltage reduces the carbon monoxide poisoning resistance. Furthermore, it is believed that the problem occurred due to Ru of the Pt—Ru alloy catalyst material because the carbon monoxide poisoning resistance is obtained by alloying Pt and Ru.

The inventors performed X-ray diffraction on the Pt—Ru alloy catalyst material used in the fuel cell. FIGS. 6 and 7 are graphs showing the X-ray diffraction before and after hydrogen gas was supplied at 100% of the utilization ratio to generate reverse voltage. In this X-ray diffraction, the strength of the face-centered cubic structure which forms the Pt-rich phase in the alloy, and the strength of the hexagonal closest packed structure which forms the Ru-rich phase, were researched. As is obvious by comparing FIGS. 6 and 7, although the strength of the face-centered cubic structure changed little, that of the hexagonal closest packed structure was greatly lowered after reverse voltage occurred. It is believed that this difference results from the fact that it is a face-centered cubic structure or a hexagonal closest packed structure, not that it is Pt-rich or Ru-rich.

The present invention was achieved by the observation of the inference described above. That is to say, in the present invention, because the Pt—Ru alloy is contained in the anode and the crystal of Pt—Ru alloy is mainly a face-centered cubic structure, Ru can exist more stably than in hexagonal closest packed structure, and even if reverse voltage occurs, leaching out of Ru can be reduced, and as a result, the carbon monoxide poisoning resistance can be maintained and deterioration of the terminal voltage can be reduced.

As described above, from the viewpoint of action and effect of the present invention, it is ideal for the entirety of the Pt—Ru alloy be face-centered cubic structure. However, it is believed that 10 to 20% of hexagonal closest packed structure is contained in an actual production process, so it is desirable that the ratio of face-centered cubic structure of the Pt—Ru alloy be more than 80%. This ratio can be decided by the ratio of peak height of X-ray diffraction.

FIG. 8 is an equilibrium diagram of Pt—Ru. As shown in this diagram, it is necessary to reduce the amount of Ru in the Pt—Ru alloy to form a face-centered cubic structure. However, this results in reducing carbon monoxide poisoning resistance. Therefore, the Pt—Ru alloy which is indicated in the two-phase area of FIG. 8 in which the face-centered cubic structure and hexagonal closest packed structure coexist, was used so far. Also in the present invention, it is desirable that the atomic ratio of Ru to Pt in the Pt—Ru alloy be 28:72 to 45:55 to improve the carbon monoxide poisoning resistance.

In the two-phase area of FIG. 8, to increase the ratio of the face-centered cubic structure, it is sufficient to apply a heating process to form FCC single phase zone in FIG. 8. According to FIG. 8, the single phase of face-centered cubic structure can be obtained by applying a process in which the Pt—Ru alloy is maintained at about 1000 to 2000° C. and then cooled quickly. According to the research of the inventors, it was confirmed that the heating process at this temperature requires about 1 to 5 hours.

In the present invention, the anode can be formed by arranging electron conducting particles such as carbon blacks carrying catalyst material of Pt—Ru alloy which mainly consists of face-centered cubic structure on its surface, and an ion conducting polymer in which the catalyst material is diffused inside. Alternatively, electron conducting particles comprising such as carbon blacks and an ion conducting polymer can also be used. As the ion conducting polymer, fluororesin based ion exchange resin can be used.

The membrane electrode assembly of the present invention is made by a method explained below. First, catalyst material comprises Pt—Ru alloy which is mainly face-centered cubic structure arranged at the surface of electron conducting particles, and the electron conducting particles and an ion conducting polymer are mixed together. Next, electron conducting particles carrying catalyst material on the surface and ion conducting polymer are mixed together to form an electrode paste, and this electrode paste is coated on a peeling film and dried to form an electrode sheet. After this electrode sheet is transferred to the anode side of the polymer electrolyte membrane, the peeling film is peeled off to obtain the membrane electrode assembly. An electrode sheet of the cathode side can be prepared by using electron conducting particles carrying catalytic material comprising Pt.

BRIEF DESCRIPTION OF THE INVENTION

BEST MODE FOR CARRYING OUT THE INVENTION

Next, the present invention is explained in detail by showing examples.

1. Preparation of Membrane Electrode Assembly

After 4500 g of dinitrodiamine platinum nitric acid solution (containing 1.5% of platinum) and 100 g of carbon blacks (Ketienblack EC) were mixed together, and platinum was carried by the carbon blacks by adding ethanol as a reducing agent.

Next, after 35.96 g of ruthenium chloride solution (containing 8.232% of ruthenium) and 710 ml of water were mixed together, 9.5 g of the carbon blacks carrying platinum described above was added, and ruthenium was also carried by the carbon black by adding ethanol. The ratio of platinum and ruthenium can be controlled by changing the amount of ruthenium in ruthenium chloride solution or the amount of mixed solution. The ratio of Pt:Ru in this example was processed to 40:60. The carbon blacks carrying Pt and Ru in the ratio of 40:60 was maintained at 1200° C. for 6 hours in an atmosphere of nitrogen gas, and cooled rapidly to process alloying of Pt and Ru. This Pt—Ru alloy was tested by X-ray diffraction, almost all the peaks observed were originated from a face-centered cubic structure.

10 g of the carbon carrying platinum and ruthenium, 100 g of ion conducting polymer (trade name: Nafion 5112, produced by Du Pont Kabushiki Kaisha), and 5 g of glycerin (produced by Kanto Kagaku) were mixed to form a catalyst paste. Next, the catalyst paste was coated to a sheet composed of FEP (tetrafluoroethylene-hexafluoropropylene copolymer) and dried. The coated amount of platinum in this case was 0.32 mg/cm$^2$. Next, the electrode sheet was transferred to the anode side of a polymer electrolyte membrane (made by Nafion) by applying a decal method.

100 g of ion conducting polymer (trade name: Nafion SE5112, produced by Du Pont Kabushiki Kaisha), 10 g of carbon particles carrying Pt in which the weight ratio of carbonblack and Pt is 50:50 (trade name: TEC10E50E, produced by Tanaka Kikinzoku Kogyo K.K), and 5 g glycerin (produced by Kanto Kagaku) were mixed together to form a catalytic paste. Next, the catalytic paste was coated to a sheet made of tetrafluoroethylene-hexafluoropropylene copolymer and dried. The coated amount of platinum in this case was 0.32 mg/cm$^2$. Next, the electrode sheet was transferred to the cathode side of a polymer electrolyte membrane (made by Nafion) by applying a decal method.

As a Comparative Example, a membrane electrode assembly was prepared by applying in the same process as described above, except that heating treatment for alloying of Pt and Ru was applied at 900°0 C. for 1 hour. The ratio of face-centered cubic structure in Pt—Ru alloy of the Comparative Example was 39% measured by the ratio of the peak height in X-ray diffraction.

2. Power Generation Test

Figure 1:
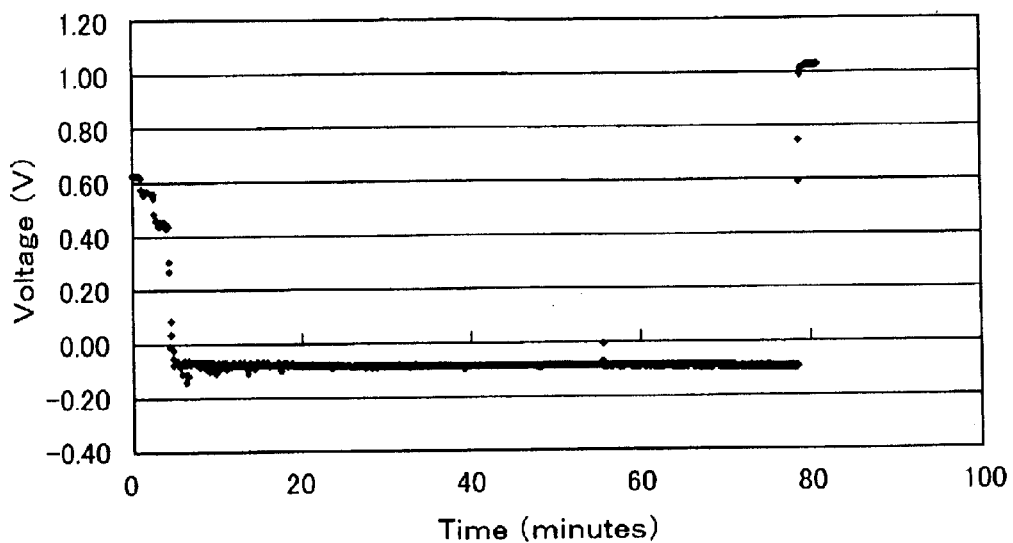
FIG. 1 is a graph showing the relationship of time and the terminal voltage of the generation in a condition of hydrogen gas deficiency.
Figure 2:
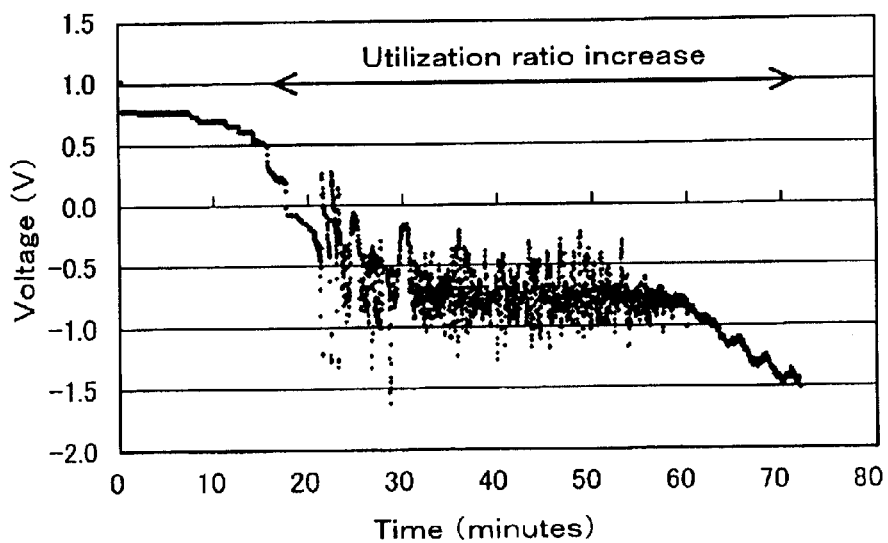
FIG. 2 is a graph showing the relationship of time and the terminal voltage of the generation in a condition of hydrogen gas deficiency.
Figure 3:
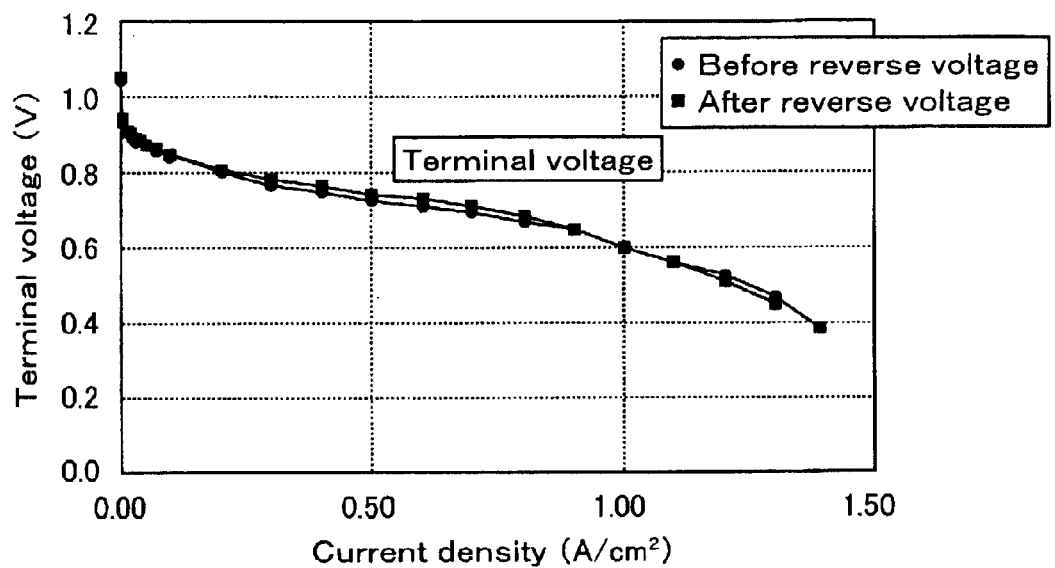
FIG. 3 is a graph showing the relationship of time and the terminal voltage of the generation after the occurring of reverse voltage.
Figure 4:
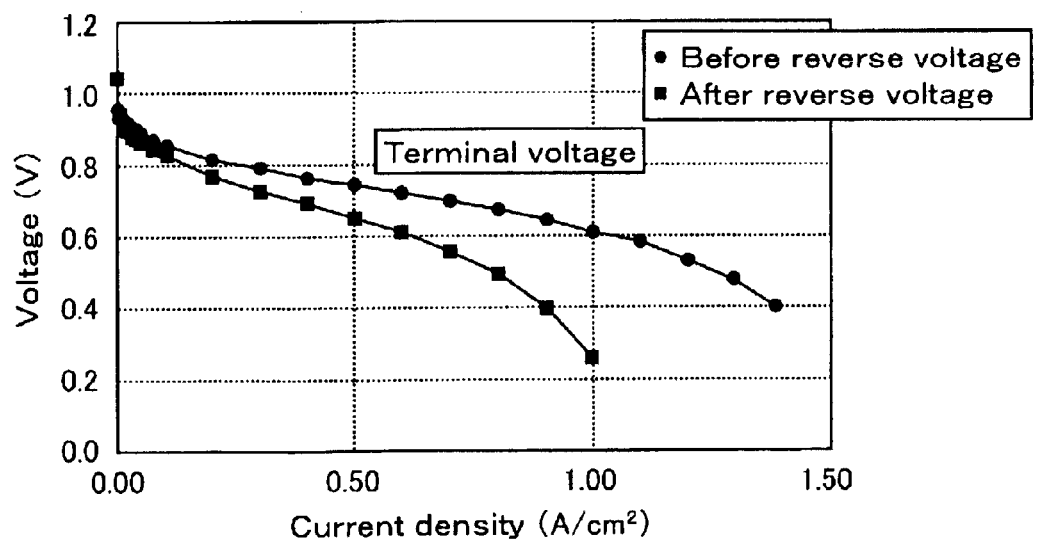
FIG. 4 is a graph showing the relationship of time and the terminal voltage of the generation after the occurring of reverse voltage.
Figure 5:
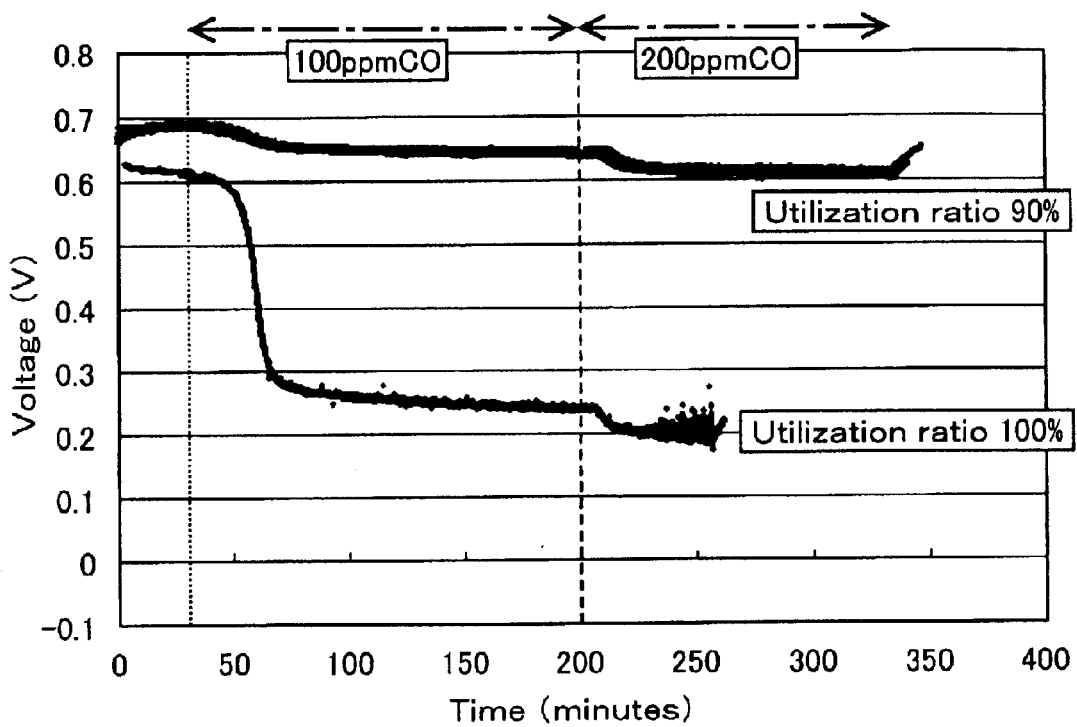
FIG. 5 is a graph showing the relationship of time and the terminal voltage of the generation in a condition of adding CO after the occurring of reverse voltage.
Figure 6:
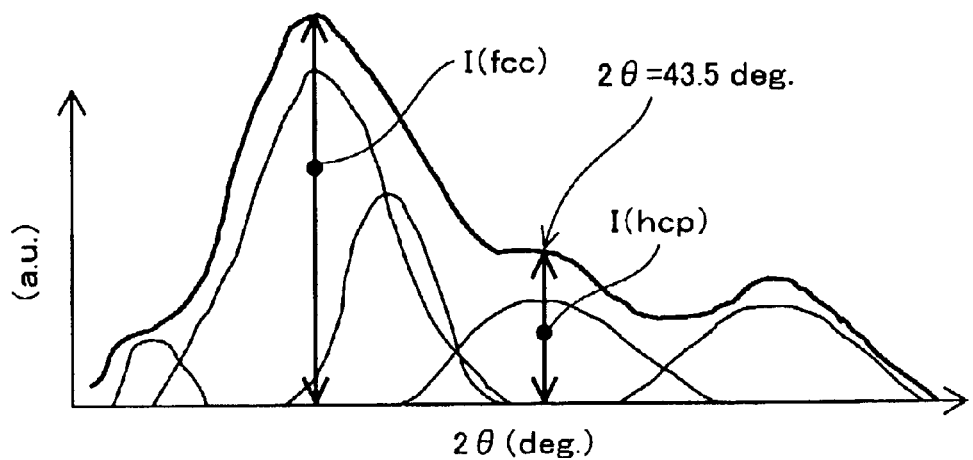
FIG. 6 is a graph showing an X-ray diffraction chart of the present invention.
Figure 7:
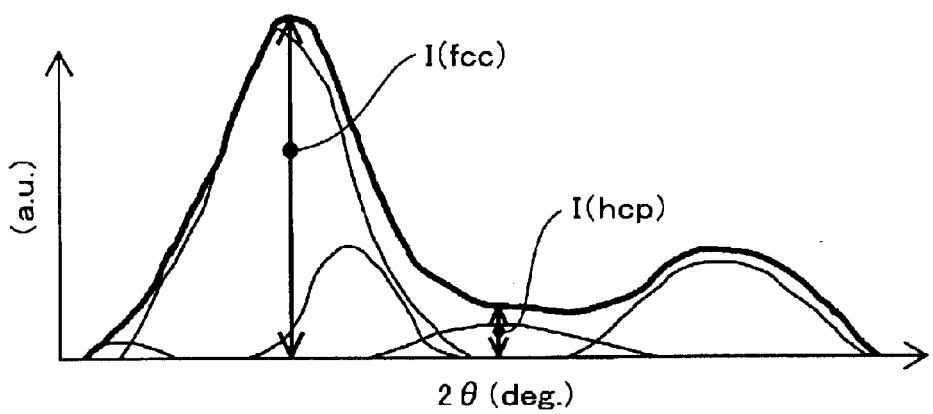
FIG. 7 is a graph showing an X-ray diffraction chart of the present invention.
Figure 8:
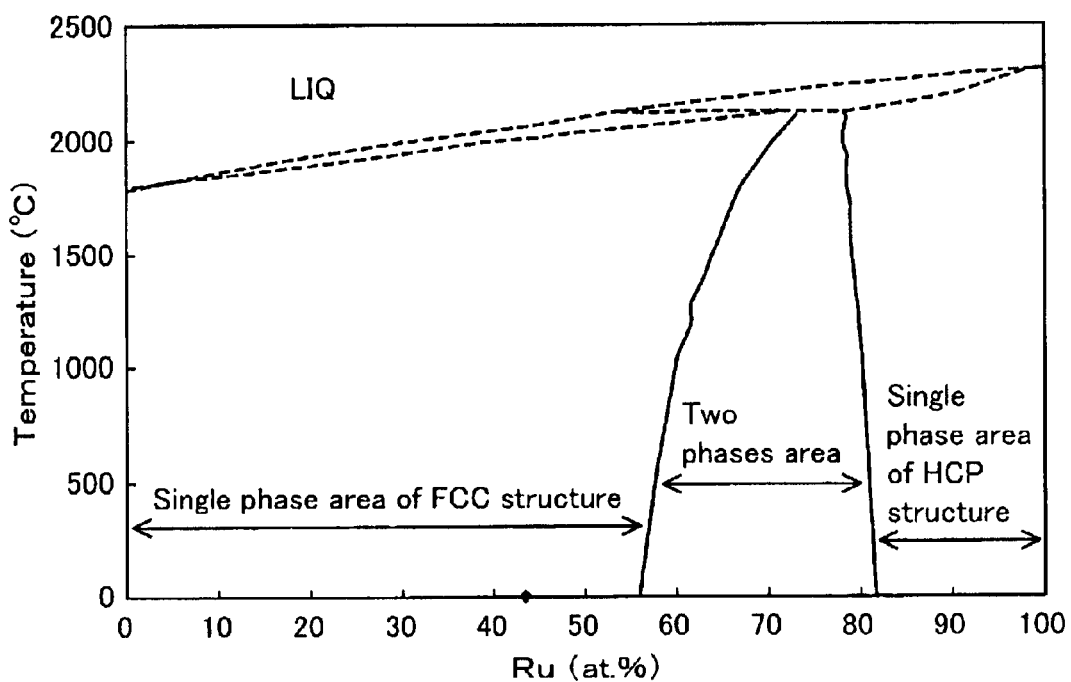
FIG. 8 is a drawing showing a part of the equilibrium diagram of Pt—Ru alloy.
Figure 9A:
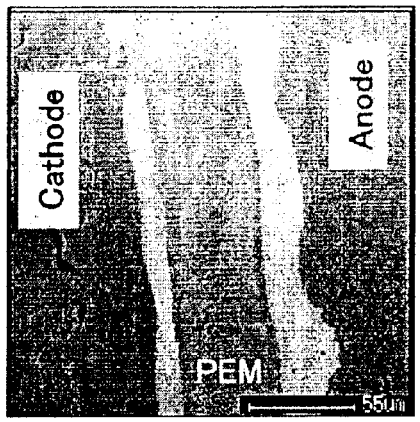
FIGS. 9A and 9B are electron micrographs showing cross-sections of the membrane electrode assembly of Examples and Comparative Examples of the present invention.
Figure 9B:
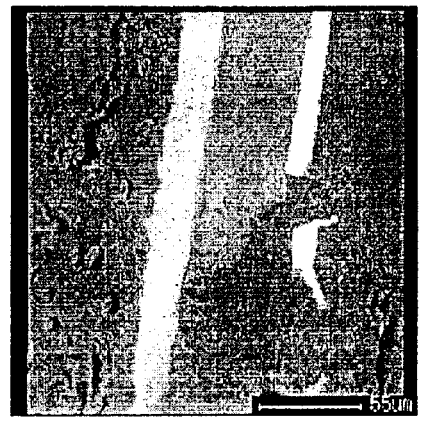

By supplying hydrogen gas and air to each side of the membrane electrode assemblies of the Example and the Comparative Example, electricity was generated for 1 hour. The temperature of hydrogen gas and air was 80° C. The utilization ratio (consumed amount/supplied amount) of hydrogen gas in this case was 100%, the utilization ratio of air was 50% (hydrogen deficiency condition). Furthermore, the humidity of hydrogen gas in this case was 50%RH, the humidity of air was 50%RH. Electron micrographs of cross-sections of these membrane electrode assemblies are shown in FIGS. 9A and 9B. In FIGS. 9A and 9B, the whitish striped part on the right is the anode and that on the left is the cathode.

Figure 10A:
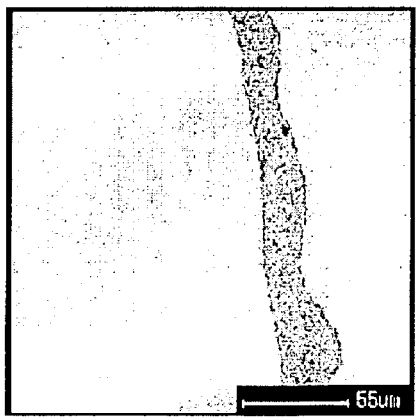
FIGS. 10A and 10B are electron micrographs showing Ru at the cross-section of the membrane electrode assembly of Examples of the present invention and Comparative Examples.
Figure 10B:
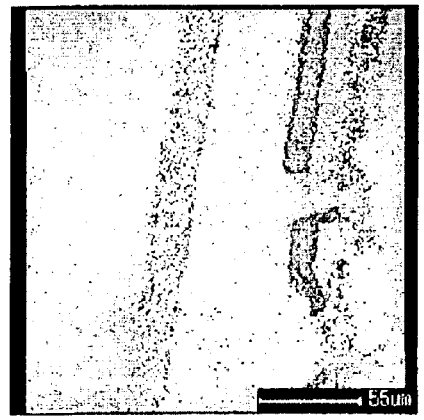

As shown in FIG. 9A, although degradation or deficiency of the anode was not confirmed in the membrane electrode assembly of the Example, degradation and deficiency of the anode in the membrane electrode assembly of the Comparative Example were confirmed. Next, FIGS. 10A and 10B are photographs showing only Ru by element mapping of the cross-section. As shown in FIG. 10A, ruthenium is staying in the anode in the membrane electrode assembly of the Example. On the other hand, in FIG. 10B, in the membrane electrode assembly of the Comparative Example, ruthenium of the anode migrated to the circumference, in particular to the cathode, and it is also confirmed that there are areas having no Ru. In this way, in the membrane electrode assembly of the Comparative Example, it was confirmed that because the ratio of face-centered cubic structure in the Pt—Ru alloy was 39%, ruthenium leached out by reverse voltage which occurs under hydrogen-deficiency condition, and carbon monoxide poisoning resistance was severely diminished.

As explained so far, in the present invention, because the anode contains catalyst material of Pt—Ru alloy and the crystal of Pt—Ru alloy is mainly face-centered cubic structure, leaching out of Ru by reverse voltage occurring by power generating under hydrogen-deficiency conditions can be restrained, and as a result, carbon monoxide poisoning resistance can be maintained.

What is claimed is:

1. A membrane electrode assembly for polymer electrolyte fuel cells, comprising:
    a cathode electrode;
    an anode electrode; and
    a polymer electrolyte membrane placed between these electrodes;
    wherein a catalyst material of Pt—Ru alloy is contained in the anode, the crystal of Pt—Ru alloy mainly has a face-centered cubic structure and the ratio of the face-centered cubic structure to hexagonal closest packed structure in the Pt—Ru alloy is more than 80%.

2. The membrane electrode assembly for polymer electrolyte fuel cells according to claim 1, wherein the Pt—Ru alloy is obtained by quenching or furnace cooling from the temperature 1000 to 2000° C.

3. The membrane electrode assembly for polymer electrolyte fuel cells according to claim 1, wherein heat treatment of the Pt—Ru alloy at 1000 to 2000° C. is conducted for about 1 to 5 hours.

4. The membrane electrode assembly for polymer electrolyte fuel cells according to claim 1, wherein the atomic ratio of Pt and Ru in the Pt—Ru alloy is in a range of from 28:72 to 45:55.

* * * * *